(12) United States Patent
Truan et al.

(10) Patent No.: US 7,347,390 B2
(45) Date of Patent: *Mar. 25, 2008

(54) MOUNTING ASSEMBLY FOR SUPPORTING A HOPPER AND A SPREADING MECHANISM ON A VEHICLE

(75) Inventors: Charles J. Truan, Royal Oak, MI (US); Paul Mandrik, Harrison Township, MI (US)

(73) Assignee: Trynex Inc., Warren, MI (US)

( * ) Notice: Subject to any disclaimer, the term of this patent is extended or adjusted under 35 U.S.C. 154(b) by 352 days.

This patent is subject to a terminal disclaimer.

(21) Appl. No.: 10/923,408

(22) Filed: Aug. 20, 2004

(65) Prior Publication Data

US 2005/0017101 A1 Jan. 27, 2005

Related U.S. Application Data

(63) Continuation of application No. 10/249,911, filed on May 16, 2003, now Pat. No. 7,118,053.

(51) Int. Cl.
E01C 19/20 (2006.01)
A01C 7/00 (2006.01)

(52) U.S. Cl. ............... 239/661; 239/172; 239/650; 239/664; 224/495; 224/519; 224/521

(58) Field of Classification Search ........... 239/172, 239/289, 650, 661, 664; 280/495; 224/519, 224/521
See application file for complete search history.

(56) References Cited

U.S. PATENT DOCUMENTS

| | | | |
|---|---|---|---|
| 3,163,339 A | 12/1964 | Merchant | |
| 3,819,120 A | 6/1974 | Walker | |
| 3,891,132 A | 6/1975 | Chandler | |
| 4,318,501 A | 3/1982 | Graber | |
| 4,648,617 A * | 3/1987 | Hannappel | 280/475 |
| 4,813,584 A | 3/1989 | Wiley | |
| 5,106,002 A | 4/1992 | Smith et al. | |
| 5,836,494 A | 11/1998 | Grunsted et al. | |
| 6,089,478 A | 7/2000 | Truan et al. | |
| 6,502,771 B1 | 1/2003 | Wyne | |
| 2002/0008364 A1 * | 1/2002 | Kahlstorf | 280/477 |

* cited by examiner

*Primary Examiner*—Theresa Trieu
(74) *Attorney, Agent, or Firm*—William H. Honaker; Dickinson Wright PLLC

(57) ABSTRACT

The subject invention provides a mounting assembly (10) for supporting a hopper (16) and a spreading mechanism (12) on a vehicle (14) for carrying and spreading a material. A spreader frame (18) supports the hopper (16) and a bumper bracket (60) is mounted to a bumper of the vehicle (14) for attaching the spreader frame (18) to a bumper. The mounting assembly (10) further includes a hitch support (70) for supporting the spreader frame (18) on a hitch receiver (72) of the vehicle (14). A plate (76) interconnects the hitch support (70) to the spreader frame (18) for adjusting a height of the hitch support (70) relative to the spreader frame (18). A pair of vertical supports (62) extend vertically from the spreader frame (18) for attachment to the bed of the vehicle (14) at an upper end (86) thereof. A coupler (90) interconnects the vertical supports (62) and the bumper brackets (60) for allowing removal of the vertical supports (62) and spreader frame (18), while the bumper brackets (60) remain mounted to the vehicle (14).

10 Claims, 3 Drawing Sheets

MOUNTING ASSEMBLY FOR SUPPORTING A HOPPER AND A SPREADING MECHANISM ON A VEHICLE

RELATED APPLICATIONS

This application is a continuation of application Ser. No. 10/249,911, filed May 16, 2003 now U.S. Pat. No. 7,118, 053, which claims priority to provisional patent application 60/382,219 which was filed May 21, 2002.

BACKGROUND OF THE INVENTION

1. Field of the Invention

The subject invention relates to a mounting assembly for supporting a hopper and a spreading mechanism on a vehicle for carrying and spreading a material.

2. Description of the Related Art

Various related art assemblies disclose a mounting assembly for supporting a hopper and a spreading mechanism on a vehicle for carrying and spreading a material. The hopper has a discharge outlet at its bottom. A drive mechanism is positioned within the hopper for auguring material from the hopper through the outlet and to the spreading mechanism. The drive mechanism has a drive shaft, to which an auger is mounted and extends into the outlet of the hopper. The spreader mechanism includes a spinner mounted to the drive shaft below the auger to receive material as it is augured out of the outlet. The spinner throws the material over a large distribution area.

One such assembly is shown in U.S. Pat. No. 6,089,478 having a spreader frame that allows attachment of the spreader to vehicles of different sizes and a hopper support frame disposed between the vehicle and the spreader frame. The hopper spreader frame includes at least one main channel and at least one adjustable channel mated with the main channel to allow the adjustable channel to move with respect to the main channel to extend or retract the overall width of the hopper support frame. In this way, the hopper support frame can be positioned on the rear of the vehicle, such as a pick-up truck, and the adjustable channels extended to the edge of the vehicle for connection to a pivot rod, latching bar or other connecting means. There are bumper mounting brackets that are bolted to the bumper of the vehicle and connected to the adjustable channels. To further secure the spreader assembly to the rear of a pick-up truck, rail mounting brackets may be used. The mounting brackets have a body portion with an underside lip, a generally U-shaped lip, which fits under the bed rail. The body portion rests on top of the bed rail and the lip is received on the bottom of the bed rail. Fasteners, such as for example bolts are threaded through the underside lip and engage the underside of the bed rail to secure the rail mounting brackets in place. To further secure the brackets, a slotted opening is formed in the body portion for receipt of a toggle bolt. The toggle bolt engages the stake pocket of the pick-up truck and further secures the bracket in place. However, '478 patent does not disclose a mounting assembly having a three-point mounting system that incorporates a hitch support mounted to the hitch receiver of the vehicle and that does not require mounting to the bed of the vehicle.

Another assembly shown in U.S. Pat. No. 6,502,771 discloses a spreader being mounted to a structural framework of a chassis of a lawnmower. A tubular mounting bracket is permanently secured to the chassis and connects to the spreader. The '771 patent does not disclose a mounting assembly having a three-point mounting system that is attached at both the bumper and the frame of the vehicle. Yet another assembly shown in U.S. Pat. No. 5,310,100 discloses a carrier assembly for mounting on a vehicle hitch. The assembly has a tube extending into the hitch receiver which supports a compartment body. A threaded body contacts a bumper of the vehicle and is adjustable for supporting the compartment body. However, the '100 patent does not disclose a mounting assembly having a three-point mounting system using bumper brackets and the hitch support.

Various other assemblies are known to those skilled in the art to be mounted to the hitch receiver of vehicles and are shown in U.S. Pat. Nos. 6,151,806; 6,481,948; and 5,423, 394. The '806 patent discloses a rear mounted snow plow that is mounted in the hitch receiver. A conventional spreader may also be mounted to the snow plow, but the '806 patent does not disclose the spreader being supported by the bumper of the vehicle. The '948 patent discloses a three-point mounting system for a vehicle known as a "$5^{th}$ Wheel". The frame is supported by the bumper and is mounted into the bed of the vehicle, i.e., the $5_{th}$ wheel. The '948 patent does not disclose a mounting assembly being mounted into the hitch receiver and supported by the bumper of the vehicle. The '394 patent discloses a three-point mounting system, but the three mounting points extend from a tube mounted into the hitch receiver. The '394 patent does not disclose supporting a frame on the bumper in combination with the hitch receiver.

The related art assemblies are characterized by one or more inadequacies. One problem with conventional spreader assemblies is the time required to install them on a vehicle and the damage done to the vehicle when the units are installed. Common spreader frame structures, as described above, are difficult to install. The various components of the frame structure have to be properly positioned and then holes drilled into the truck bed or rails and bumper. Several hours are required for a typical assembly. Additionally, the spreader support frames are designed for a particular vehicle which creates the need for large inventories of frames to fit various vehicles. Also, the support for these frames is derived from the bed of vehicle, as well as the bumper, to provide support to the assembly. If the vehicle bed was to be made of a different, less sturdy, material, such as plastic, the support frames become unstable. It is a desire of those in the vehicle industry to manufacture vehicles having plastic beds, therefore, these related art assemblies would not be as secure when mounted to the plastic bed.

BRIEF SUMMARY OF THE INVENTION AND ADVANTAGES

The subject invention provides a mounting assembly for supporting a hopper and a spreading mechanism on a vehicle for carrying and spreading a material. The mounting assembly includes a spreader frame for supporting the hopper, a bumper bracket for attaching the spreader frame to a bumper of the vehicle, and a hitch support for supporting the spreader frame on a hitch receiver of the vehicle.

Accordingly, the subject invention overcomes the inadequacies that characterize the related art assemblies. Specifically, the subject invention provides a three point system for supporting the hopper on the rear of the vehicle. The three point system can be utilized on pick up trucks having a bed made entirely of plastic and still provide adequate support for the assembly because the assembly relies on the bumper and hitch for support and not the bed of the vehicle. The subject invention also accommodates vehicles having bumpers at different heights. Also, the assembly can be retrofit to existing spreader assemblies without having to purchase an entire spreader assembly. Another advantage of the subject invention is that the assembly allows a tailgate of the vehicle to be lowered without disconnecting the entire assembly. Therefore, installation is quick and easy because the assembly is attached to the vehicle and the remaining part is quickly connected.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein:

FIG. 3 is a close-up view of the bumper bracket, the hitch support, and a vertical support.

DETAILED DESCRIPTION OF THE INVENTION

Figure 1:
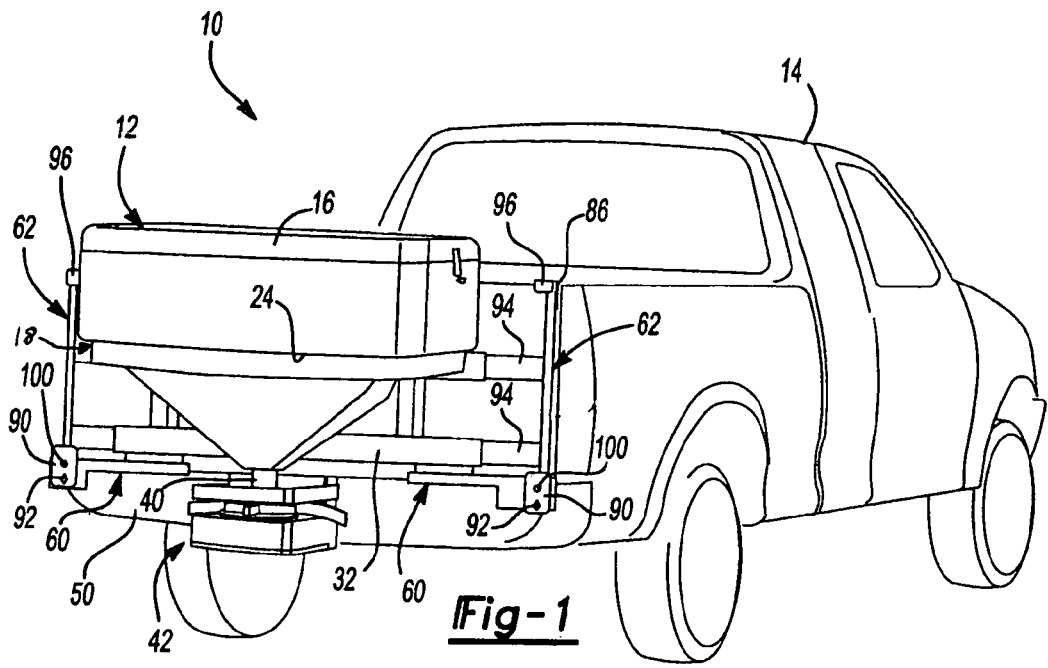
FIG. 1 is a perspective view of the subject invention being attached to a vehicle.

Referring to the Figures, wherein like numerals indicate like or corresponding parts throughout the several views, a mounting assembly for supporting a hopper 16 and a spreading mechanism 12 on a vehicle 14 for carrying and spreading a material (not shown) is shown generally at 10 in FIG. 1. The spreader mechanism 12 is ideally suited for spreading salt, seed, fertilizer, etc. As illustrated, the spreader mechanism 12 is mounted to the vehicle 14 such as, for example, to the rear of a pick-up truck. A spreader frame 18 supports the hopper 16. The hopper 16 has an outlet 40 for discharging the material. The assembly 10 provides a three point mounting system for securing the spreader mechanism 12 to the vehicle. It is appreciated that the assembly 10 may also be mounted to the front of the vehicle 14.

Figure 2:
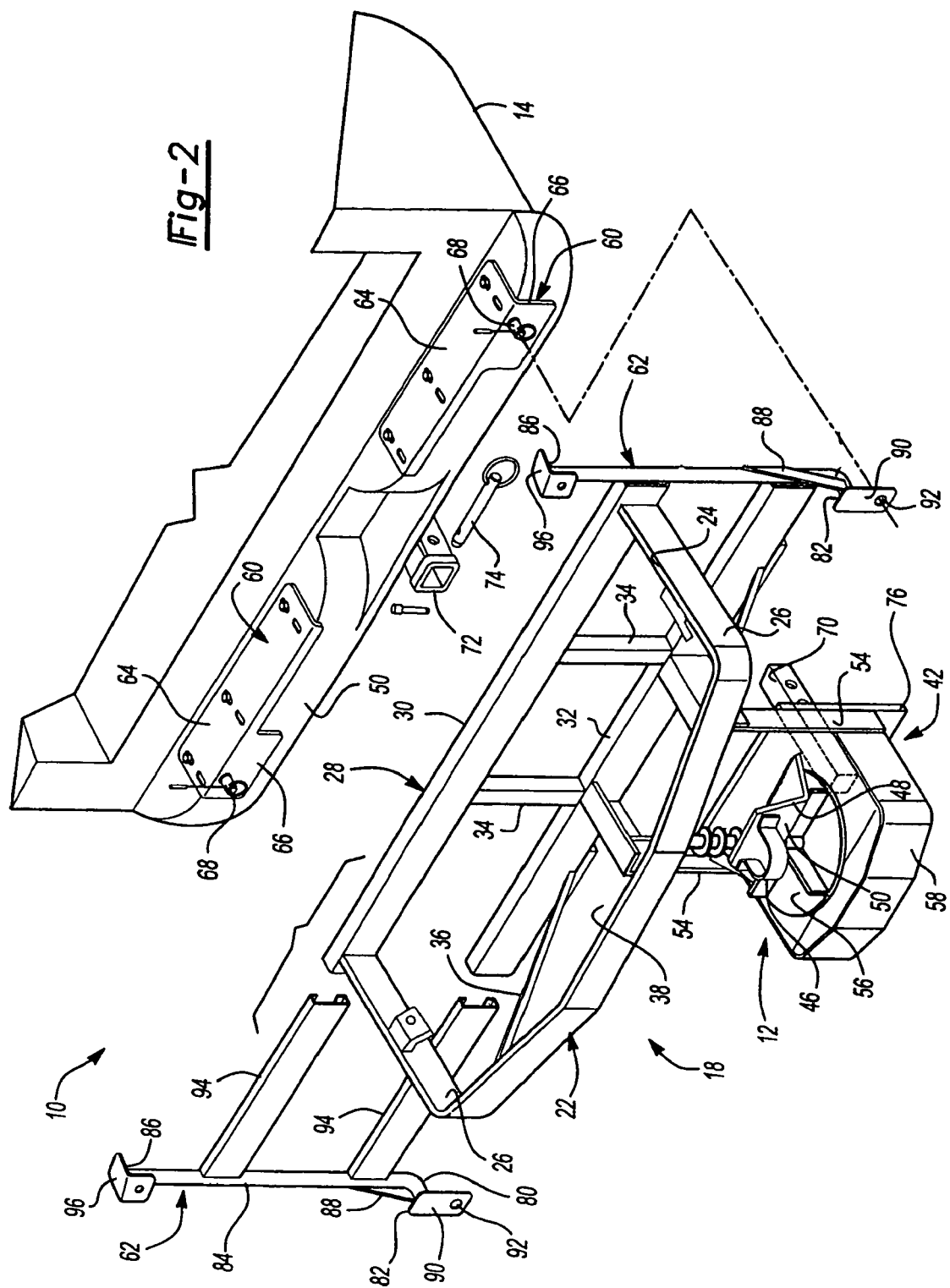
FIG. 2 is an exploded view of a mounting assembly having a spreader frame, a bumper bracket, and a hitch support.

Referring to FIG. 2, the spreader frame 18 has a main frame 22 that supports the hopper 16. The main frame 22 includes side members 26 and a rear member 28. The main frame 22 also has a surface 24 for engaging the hopper 16. In one embodiment, the rear member 28 has an upper and a lower rear members 30, 32 that extend parallel to each other. The upper and lower rear members 30, 32 are connected to each other by vertical members 34 for support. The rear member 28, more preferably the lower rear member 32, has a pair of support arms 54 coupled thereto. The side members 26 preferably extend from the upper rear member 30 and have crossbars 36 supporting the side members 26. The crossbars 36 extend from the side members 26 to the lower rear member 32 for additional support. The upper rear member 30 and the side members 26 define an opening 38 for receiving and supporting the hopper 16.

A bumper bracket 60 is mounted to a bumper of the vehicle 14 for attaching the spreader frame 18 to the bumper. In the preferred embodiment, the bumper bracket 60 is secured to the bumper with bolts. However, other fastening devices may be used to secure the bracket 60 to the bumper. As shown in FIG. 2, two bumper brackets 60 are utilized, one at each end of the bumper to support the weight of the hopper 16 and the spreader mechanism 12 across the width of the vehicle 14. In the preferred embodiment, the bumper bracket 60 has a horizontal surface 64 and a vertical surface 66, such that the horizontal surface 64 engages the top of the bumper on the vehicle 14 and the vertical surface 66 extends down the face 50 of the bumper. The vertical surface 66 also has a post 68 extending therefrom. The post 68 may include a hoop 100 for locking the spreader frame 18 to the bumper bracket 60. However, it should be understood that the post 68 may be positioned elsewhere on the bumper bracket 60 and accomplish the same purpose as will be described below. The bumper bracket 60 has a low profile which allows the bumper bracket 60 to remain attached to the vehicle when the remainder of the mounting assembly 10 is removed and the tailgate of the vehicle 14 can be lowered.

The mounting assembly 10 further includes a hitch support 70, also shown in FIG. 3, for supporting the spreader frame 18. The hitch support 70 is mounted into a hitch receiver 72 of the vehicle 14. A securing device 74 secures the hitch support 70 into the hitch receiver 72. Preferably the securing device 74 is a locking pin. The securing device 74 extends into and through the hitch receiver 72 and the hitch support 70. The hitch receiver 72 is typically a 2-inch Reese type receiver.

As best shown in FIG. 3, a plate 76 interconnects the hitch support 70 to the spreader frame 18 and defines slots 78 for adjusting a height of the hitch support 70 relative to the spreader frame 18. Fasteners extend from the spreader frame 18 and through the slots 78 to allow vertical adjustment of the plate 76. In one embodiment, the plate 76 engages the support arms 54 of the spreader frame 18. The fasteners may be welded to the support arms 54 or may be inserted through the support arms 54. The plate 76 slides vertically within the slots 78 to accommodate vehicles 14 that have the hitch receiver 72 at different heights without having to switch spreader frames 18. The plate 76 also allows for retrofitting older frames to have a three-point mounting system without having to purchase a new assembly.

A pair of vertical supports 62 extend vertically for attachment to the spreader frame 18. Additionally, the vertical supports 62 may be attached the bed of the vehicle 14 at an upper end 86 thereof. The vertical support 62 engages the spreader frame 18 and bumper bracket 60. For illustrative purposes, the bumper bracket 60 is shown being removed from the vehicle. The vertical support 62 has a lower end 82 and the upper end 86. Preferably, the upper end 86 extends perpendicular relative to the horizontal portion 64 of the bumper bracket 60. The lower end 82 extends generally parallel relative to the horizontal portion 64, creating the vertical support 62 having an "L" shape. A cross support arm 88 extends between the lower end 82 and the upper end 86 for adding additional support to the vertical support 62.

Figure 4:
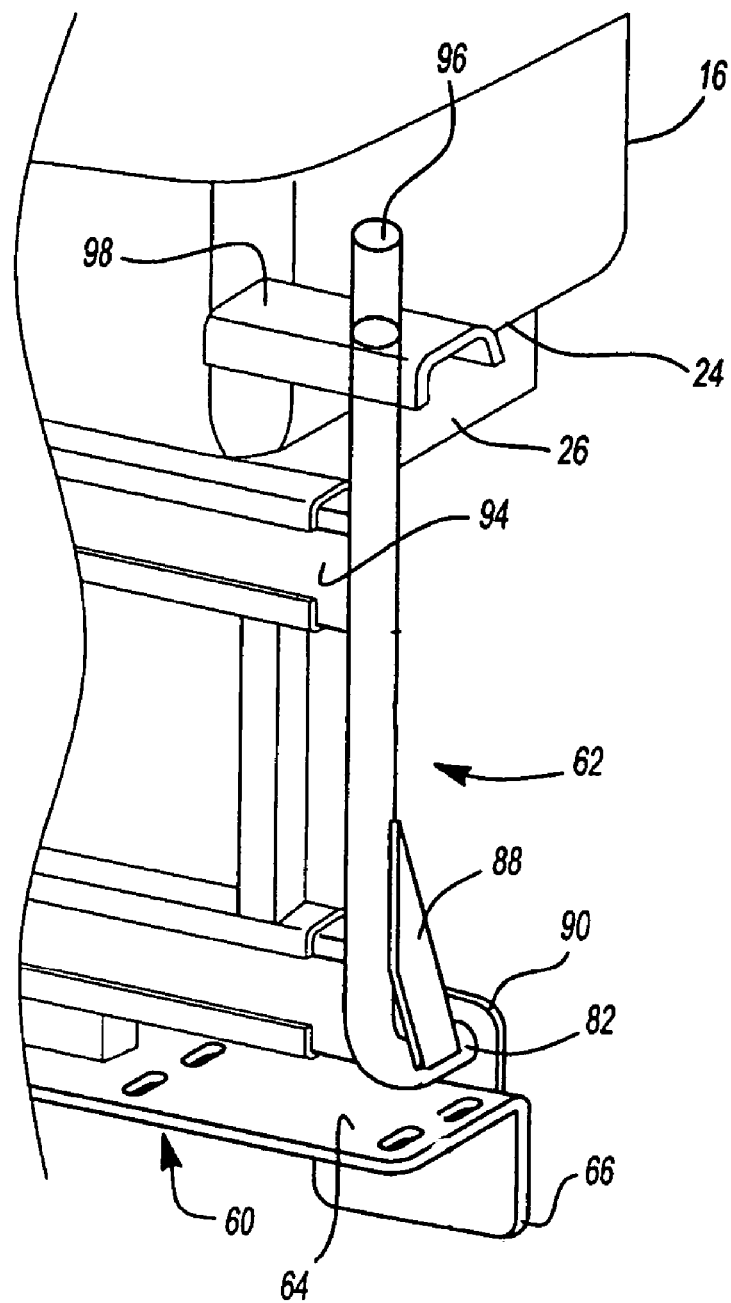
FIG. 4 is a perspective view of another embodiment of the vertical support having a fastening support to attach to the vehicle.

A fastening support 96 for attaching each of the vertical supports 62 by securing to the vehicle 14 is shown in FIG. 3. The fastening support 96 connects to the upper end 86 for attaching to the vehicle 14. In the one embodiment, the fastening support 96 is a strap or a rope connected at one end to the vertical support 62 and the other end connected to the vehicle 14. The strap can be tightened by any means known in the art, such as with a crank. As the strap is tightened, the vertical support 62 becomes more secure, which in turn secures the mounting assembly 10. Alternately as shown in FIG. 4, the fastening support 96 may be a fastening bracket 98 being one of U-shaped, L-shaped, and C-shaped for attaching the vehicle 14. Preferably, the fastening bracket 98 is inserted into the vertical support 62. As shown, the fastening bracket 98 is generally an inverted C-shaped clamp that engages the tailgate of the vehicle 14. Each vertical support 62 would be connected to the fastening bracket 98 to provide a four point mounting system.

A coupler 90 interconnects the vertical supports 62 and the bumper brackets 60 for allowing removal of the vertical supports 62 and spreader frame 18, while the bumper brackets 60 remain mounted to the vehicle 14. Referring back to FIG. 2, the coupler 90 is mounted to the lower end 82 of the vertical supports 62. The coupler 90 defines a hole 92 through which the post 68 of the bumper brackets 60 extends therethrough to connect the vertical support 62 to the bumper bracket 60. A locking device may be used to lock the post 68 after inserting through the hole 92 and to prevent the vertical support 62 from disengaging the bumper bracket 60. Preferably, the locking device is a pin as is known in the art.

The vertical support 62 also has two horizontal arms 94 extending horizontally from the vertical support 62 for engaging the spreader frame 18. The horizontal arms 94 are slideably received and fastened to the spreader frame 18. As should be appreciated, the horizontal arms 94 are slideable to adjust the width of the mounting assembly 10 to accommodate vehicles having wider or narrower rear bumpers and beds. In the disclosed embodiment, the arms 94 are inserted into the upper and the lower rear members 30, 32 and fixedly connected together by bolts, screws, or other devices as is known in the art.

Referring again to FIG. 2, a bracket assembly 42 is shown for securing the outlet 40 of the hopper 16 adjacent the spreader mechanism 12. It is to be appreciated that the bracket assembly 42 is known to those skilled in the spreader arts. The bracket assembly 42 includes a clamp 46 for engaging and securing the outlet 40 of the hopper 16. A bracket 48 has a face 50 that receives bolts or screws to retain the clamp 46. The support arms 54 extend from the lower rear members 32 of the spreader frame 18 to support the bracket 48. The support arms 54 may be made of angle iron, but other types and shapes of supports could be used as will be obvious to those of ordinary skill in the art. The support arms 54 are welded, bolted, or otherwise attached to the lower rear member 32. The spreader mechanism includes a spinner 56 and a spinner guard 58. The spinner guard 58 protects the spinner 56 from being damaged during operation and non-operation.

As set forth above, the three-point mounting system transfers weight through the vertical supports 62 down to the bumper brackets 60. The weight is also carried by the hitch support 70 to eliminate the side to side torque of the assembly 10. This is important because the hitch receiver 72 is typically rated for 500 lbs. Therefore, the hitch support 70 supports no more than 500 lbs., while the bumper brackets 60 and the fastening support 96 carry the remaining weight. This allows for more than 500 lbs. of material to be used in the subject invention because the weight is supported by the bumper brackets 60 and the fastening supports 96. The three-point mounting is also important for use with vehicles having plastic beds because the mounting assembly of the subject invention does not directly mount to the bed.

Obviously, many modifications and variations of the present invention are possible in light of the above teachings. The invention may be practiced otherwise than as specifically described within the scope of the appended claims.

What is claimed is:

1. A mounting assembly for supporting a hopper and a spreading mechanism on a vehicle for carrying and spreading a material, said mounting assembly comprising:
    a spreader frame for supporting the hopper;
    a pair of bumper brackets spaced from one another for attaching said spreader frame to a bumper of the vehicle; said spreader frame includes a rear member having a pair of support arms coupled thereto;
    a hitch support adjustable in a vertical direction relative to said spreader frame for supporting said spreader frame on a hitch receiver of the vehicle;
    a plate coupled to said hitch support and said spreader frame to allow vertical adjustment of said hitch support;
    said plate defines continuous, elongated slots that allow said hitch support to be adjusted vertically relative to said spreader frame for accommodating different hitch receiver heights of various vehicles;
    wherein said hitch support and said pair of bumper brackets are coupled to said spreader frame to support said spreader frame thereto.

2. A mounting assembly as set forth in claim 1 further comprising a pair of vertical supports coupled to said spreader frame for attachment to a bed of the vehicle at an upper end thereof.

3. A mounting assembly as set forth in claim 2 further comprising a coupler interconnecting said vertical supports and said bumper bracket for removing said vertical supports while said bumper bracket remains mounted to the vehicle.

4. A mounting assembly as set forth in claim 3 wherein said coupler defines a hole and said bumper bracket further includes a post for extending through said hole to connect said vertical support to said bumper bracket.

5. A mounting assembly as set forth in claim 4 further comprising a locking device to lock said post after inserting through said hole and to prevent said vertical support from disengaging said bumper bracket.

6. A mounting assembly as set forth in claim 5 wherein said locking device is a pin.

7. A mounting assembly as set forth in claim 2 further comprising a fastening support coupling each of said vertical supports to the vehicle.

8. A mounting assembly as set forth in claim 7 wherein said fastening support is further defined as a fastening bracket being one of U-shaped, L-shaped, and C-shaped for attaching to the vehicle.

9. A mounting assembly as set forth in claim 1 further including a securing device for securing said hitch support to the hitch receiver.

10. A mounting assembly as set forth in claim 1 further comprising fasteners coupled to said support arms for extending through said elongated slots to allow precise vertical adjustment of said plate relative to said spreader frame.

\* \* \* \* \*